United States Patent

[11] 3,628,061

[72] Inventor Robert W. Jackman
San Diego, Calif.
[21] Appl. No. 886,005
[22] Filed Dec. 17, 1969
[45] Patented Dec. 14, 1971
[73] Assignee Universal Signal Corporation
Continuation-in-part of application Ser. No. 609,890, Jan. 17, 1967, now abandoned. This application Dec. 17, 1969, Ser. No. 886,005

[54] NOISE REDUCTION SYSTEM

17 Claims, 6 Drawing Figs.

[52] U.S. Cl. ........ 307/237, 328/127, 328/186, 307/227
[51] Int. Cl. ........ H03k 5/08
[50] Field of Search ........ 307/237, 227, 222; 328/127, 186

[56] References Cited

UNITED STATES PATENTS

| | | | |
|---|---|---|---|
| 3,252,105 | 5/1966 | Patchell | 328/127 |
| 3,274,501 | 9/1966 | Heinsen | 328/127 |
| 3,317,743 | 5/1967 | Rogers | 307/227 |
| 3,398,373 | 8/1968 | Caswell | 328/127 |
| 3,500,067 | 3/1970 | Davis et al. | 307/237 |
| 3,514,635 | 5/1970 | Gilbert | 307/237 |

*Primary Examiner*—Donald D. Forrer
*Assistant Examiner*—Harold A. Dixon
*Attorney*—Harris, Kiech, Russell and Kern

ABSTRACT: A system for reducing noise in an electrical signal. Diodes provide for limiting the incremental magnitude of output voltage change relative to a previous output voltage level. With diode bias, the permitted change is controlled by feedback from the system output and by externally applied control voltages. A digital ramp voltage generator is presented incorporating such a system for eliminating noise spikes resulting from noncoincident operation of flip-flops.

INVENTOR
ROBERT W. JACKMAN
BY HIS ATTORNEYS
HARRIS, KIECH, RUSSELL & KERN

INVENTOR
ROBERT W. JACKMAN
BY HIS ATTORNEYS
HARRIS, KIECH, RUSSELL & KERN

NOISE REDUCTION SYSTEM

This application is a continuation-in-part of my copending application entitled NOISE REDUCTION SYSTEM, Ser. No. 609,890, filed Jan. 17, 1967, now abandoned.

This invention relates to systems for the control of noise in electrical signals. An electrical signal has two portions, namely, the desired or information component and the undesired or noise component. Electrical noise occurs in various forms and is produced by many sources, both known and unknown, and a variety of arrangements are utilized for reducing or eliminating noise. Of course, noise control systems should not adversely affect the information component of a signal.

It is an object of the present invention to provide a new and improved noise control system, and particularly such a system which is simple, inexpensive and readily adapted to a wide variety of electrical signals. A further object is to provide a new and novel process for controlling noise in an electrical signal-handling system.

Noise often is in a higher frequency spectrum than information in a signal and a variety of low-pass filtering arrangements have been utilized for noise reduction. It is an object of the present invention to provide a noise control system in which rate of change limiting in both voltage and frequency, or rate limiting of signals, is controllable to provide for improved noise rejection. A particular object is to provide such a system which can control the rate limiting as a function of time and/or as a function of the incoming signal, to provide a varying control, and to provide different controls for positive and negative going signal excursions.

It is an object of the invention to provide a noise control system having circuit means defining a signal path for connecting the system input to the system output, a storage capacitance, means connecting the storage capacitance to the circuit means at a first junction for charging to a voltage level varying as a function of the voltage at the system output with the storage capacitance serving as a memory device to provide a reference voltage, a first diode having one terminal connected to the circuit means between the system input and the first junction, and a first control circuit connected to the other terminal of the first diode so that the diode is out of the signal path, with the control circuit providing a bias voltage to the diode, and including means connecting the reference voltage of the storage capacitance as an input to the control circuit. In such a system, the magnitude of voltage change at the system output as the voltage changes at the system input, is limited in one direction by the action of the diode, with the effect of the diode being controlled by the voltage stored on the capacitance. A further object is to provide such a system wherein an external control voltage may be combined with the stored capacitance voltage. An additional object is to provide such a system incorporating a second diode connected with opposite polarity for limiting of input voltage changes in the opposite direction. It is a particular object of the invention to provide such a system wherein both diodes may be biased from a single control circuit and wherein separate control circuits may be provided for each diode as desired, providing flexibility in the system for various input signals and noise problems.

It is a particular object of the invention to provide a noise control system for use with a digitally generated ramp voltage for eliminating voltage spikes due to noncoincident operation of flip-flops without adversely affecting the retrace.

The present invention provides a form of noise reduction which may be used to improve the performance of a digitally formed ramp voltage generator. This function is accomplished by the control of voltage changes that are allowed to occur as the relatively small increments of voltage steps take place in the process of constructing the ramp waveshape. The control of these voltage changes is performed by the limiting action of diodes, suitably biased by a capacitor voltage in response to the changing output ramp voltage.

An overall system is shown in FIG. 1, and a typical limiter circuit is shown in FIG. 2. In this particular embodiment, the bias voltage developed is a result of both the capacitor voltage and the external control voltage as they may be added in the control units 39, 41.

The input waveshape 15 contains the type of noise which usually accompanies a digitally formed ramp. One method of reducing these noise spikes, formed by noncoincident operation of flip-flops, is accomplished by using low-pass filters. However, such filters become an inherent disadvantage in terms of the rapid flyback times usually required. The present invention provides an alternate means of extracting those noise spikes without producing said disadvantage. By allowing capacitor 34 to provide bias voltages to the diodes 37, 40, the circuit is in effect a variable voltage window which cannot pass the noise spikes which fall outside that window.

The invention also comprises novel combinations and arrangements of parts, which will more fully appear in the course of the following description. The drawings merely show and the description merely describes preferred embodiments of the present invention which are given by way of illustration or example.

Figure 1:
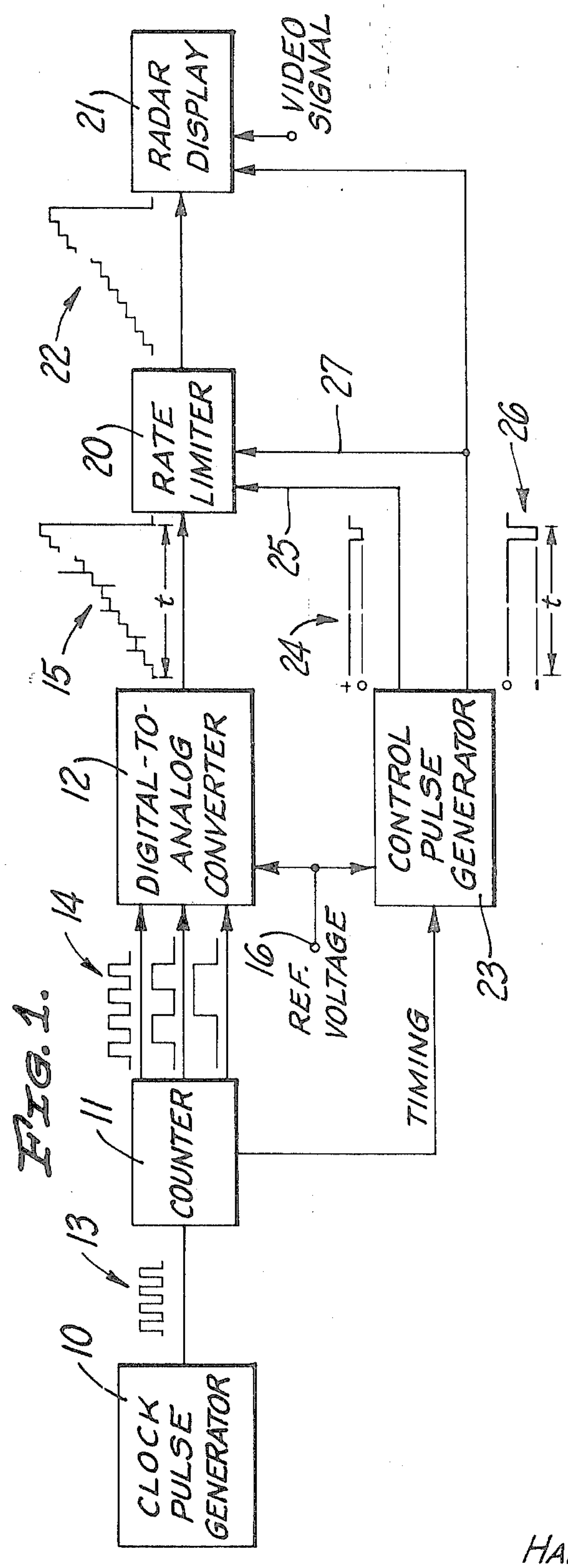
FIG. 1 is a block diagram illustrating the use of the noise control system of the invention in conjunction with a digital ramp voltage generator for a cathode ray tube display.

The noise control system of the invention may be utilized to reduce or eliminate voltage spikes occurring in the output of a digitally generated ramp voltage such as is used to provide a sweep voltage for a cathode ray tube display in a radar system. The ramp voltage comprises a large number of small-increment voltage steps to provide the sweep or trace and a retrace or return-to-zero voltage. Ideally the retrace time should be zero and always occurs within a very short period of time, resulting in a very steep wave front. As an example, one cycle of a digitally generated ramp voltage may utilize 1024 counts, with 1020 individual voltage steps forming the ramp and with the retrace taking place during the remaining four counts.

Ramp voltage generators of this type are well known and typically will include a clock pulse generator 10, a counter 11, and a digital-to-analog converter 12. The clock pulse generator 10 develops a pulse train 13 which serves as an input to the binary counter 11. The counter 11 has cascaded flip-flops equal in number to the number of parallel binary outputs, indicated at 14, required to drive the converter 12 to achieve the desired number of steps in the ramp waveform 15.

THe converter 12 is conventional and may comprise an operational amplifier connected in a summing circuit with each input resistance value inversely proportional to the weight of the parallel bit applied to that input resistance. An adjustable reference voltage is applied at terminal 16 and the amplitude of the ramp waveform 15 is directly proportional to this reference voltage.

Voltage spikes are produced in the stairstep waveform 15 by noncoincidence in the switching of flip-flops in the counter 11. The magnitude of the voltage spike depends upon the particular flip-flops involved and for a positive going ramp, a positive going spike may be generated equal to half the maximum ramp voltage and a negative going spike may be generated which effectively returns the voltage to zero. These spikes are not wanted in the ramp voltage and hence comprise one type of noise. A conventional low-pass filter could be utilized for removing or reducing the magnitude of the spikes except for the requirement of a very fast return to zero voltage at the end of the cycle.

The noise control system of the invention provides for eliminating the voltage spikes without adversely affecting the retrace time.

A rate limiter 20 is connected between the converter 15 and the display 21, with the noise-free waveform indicated at 22. A control pulse generator 23 provides a positive control voltage 24 on line 25 for the rate limiter and a negative control voltage 26 on line 27. One of the control voltages, here the voltage 26, may be utilized to provide a blanking signal to the display 21 if desired. A timing signal may be provided from the counter 11 to the generator 23 for synchronizing the operation of the generator 23 with the counter and converter. The reference voltage 16 may also be connected to the generator 23 so that an adjustment which changes the magnitude of the ramp voltage will make a corresponding change in the magnitude of the control voltages.

Figure 2:
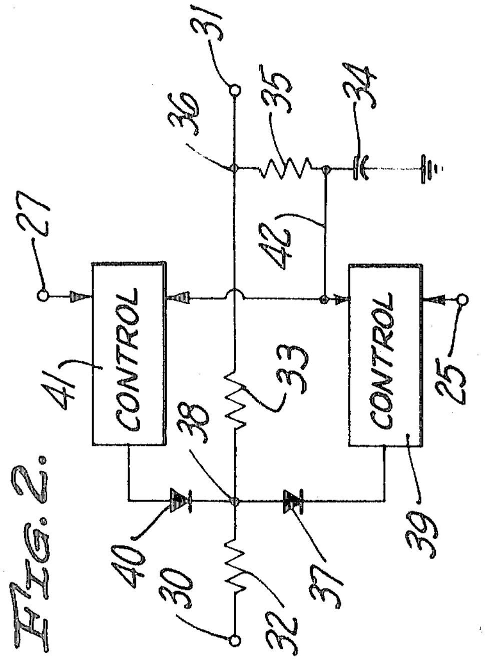
FIG. 2 is a block diagram illustrating the rate limiter of FIG. 1.

The rate limiter 20 is shown diagrammatically in FIG. 2 with the converter output connected as an input at 30 and with the noise-free output appearing at 31 for connection to the radar display or other utilization device.

The input 30 is connected through resistors 32, 33 to the output 31. A storage capacitance 34 is connected through a resistor 35 to a junction point 36 adjacent the output 31. A diode 37 is connected between a junction point 38 and a control unit 39 and a second diode 40 is connected between the junction 38 and another control unit 41, with the diodes having opposite polarities. The control pulse generator 23 and the capacitor 34 provide inputs to the control unit 39 through lines 25 and 42, respectively. Similar inputs are provided for the control unit 41 through lines 27 and 42.

The control units 39, 41 provide bias voltages for the diodes 37, 40, respectively. With the diode 37 biased to zero volts, the diode is the equivalent of a short circuit and a positive going signal at terminal 30 produces no voltage change at junction 38 and hence no voltage change at the output 31. If the diode 37 is back biased at a relatively high voltage, the diode is the equivalent of an open circuit and has no effect on a positive going signal at the input terminal 30. When the output of the control unit 39 changes from a high voltage to zero, it effectively acts as a switch for closing and opening the circuit between the input 30 and output 31. When the control unit 39 provides an output voltage to the diode 37 which is less than the voltage change at the input 30, the voltage change at the junction 38 will follow that of the input until it equals that of the bias voltage, at which level the voltage change will cease. The operation with the diode 40 and control unit 41 is the same with negative voltage signals.

The description of operation in the preceding paragraph assumes an ideal diode, i.e., a diode with no potential drop. A semiconductor diode will have a potential drop which varies some with current and with temperature, but for most situations the potential drop of present day diodes can be considered a constant of about 0.6 volts. In circuits where this figure is significant, forward bias of 0.6 volts can be introduced to achieve substantially ideal diode operation. Also, the potential drop of the diode can be used to provide a built-in backbias in certain applications of the invention (see the circuit of FIG. 6, infra).

The storage capacitance 34 also affects the operations of the circuit by providing an input to the control units which varies as a function of the voltage at the output 31. As an example of the operation, consider the situation where initially the signal at the input 30 is a positive 10 volts and the capacitance 34 has a zero charge and the control voltages at terminals 25 and 27 are at or near zero such that the diodes 37, 40 hold the voltage at junction 38 at zero. If the control voltage at 25 is increased to a positive voltage greater than 10 volts, the diode 37 is backbiased and effectively becomes an open circuit. The 10-volt signal at the input 30 appears at the output 31 and the capacitance 34 will start to charge toward 10 volts through the resistor 35. The initial rate of charge in the time required to charge to the 10-volt level will depend upon the magnitude of the resistance 35 and the capacitance 34. The potential on the capacitance 34 will ultimately reach the 10 -volt level of the output 31 and this voltage is added as an input to the control units, increasing the backbias on the diode 37 to 20 volts and providing a positive 10 volts on the diode 40. During this period, the circuit of FIG. 2 has transmitted positive going voltages while blocking negative going voltages. Of course, a positive going voltage greater than the control voltage at the line 25 would be limited to that maximum change.

If the control voltage at 25 is now returned to zero, the bias voltage on the diode 37 will be reduced to 10 volts. Now both diodes are biased at positive 10 volts so that no further changes at the input 30 can be transmitted to the output 31. That is to say, the circuit has stored or memorized the input signal during the period the control voltage was applied at the line 25, and the circuit will not change its output until a change is made in one or both of the control voltages.

If the control voltage at 25 is a fixed positive value and the control voltage at 27 is fixed at the same value but negative, both diodes 37, 40 will be backbiased. The voltage at the input 30 can assume any value initially without causing either diode to conduct, as long as this initial value does not exceed that of the control voltages. For example, assume that the voltage at 25 is +5 volts and at 27 is −5 volts. If the input at 30 suddenly steps from zero to +5 volts, the output at 31 will also step from zero to +5 volts. Immediately following the input voltage change, the potential across the diode 37 will be zero and the backbias across the diode 40 will be increased from 5 volts to 10 volts. The capacitance 34 will charge to +5 volts, increasing the voltage output from the control unit 39 to +10 volts and decreasing the output from the control unit 41 to zero volts, with both diodes backbiased at 5 volts and with the junction 38 at +5 volts. The input signal can be stepped back to zero volts or up to +10 volts and the output voltage will also step to zero volts or to +10 volts without causing either diode to conduct. The charge on the capacitance 34 will change in the same manner and change the outputs of the control units. No signal energy has been dissipated in the input resistance 32.

However, if the control voltages at 25 and 27 are less than the voltage step at the input 30, a different result obtains. Suppose the voltage at 25 is +1 volt and at 27 −1 volt, the charge on the capacitance 34 is zero and the input voltage changes from zero to +5. The voltage at 38 and 31 will go positive 1 volt at which time the diode 37 conducts and stops any further change in the positive going direction. Current will flow through the resistance 32 and the capacitance 34 will charge through the resistance 35 and the rate of change in potential at output 31 is E/T volts per second, where E is the control voltage and T is the product RC of the resistance 35 (in ohms) and the capacitance 34 (in farads). As the potential across the capacitance 34 increases in the positive direction, this voltage is added to the control voltage at 25 in the control circuit 39, changing the bias on the diode 37 and maintaining the potential across the resistance 35 at 1 volt. The capacitance charges linearly and when the capacitance potential reaches 4 volts, the voltage across the diode 37 will be reduced to zero and the voltage at the output 31 will have reached 5 volts. The output will remain at 5 volts and the capacitance will continue to charge exponentially toward 5 volts. Ultimately the capacitor will be charged to the output voltage and each of the diodes will be backbiased at 1 volt, as in the initial condition.

If the input voltage at 30 is stepped back to zero volts, the output voltage at 31 will follow to the +4 volt level, at which time the diode 40 will conduct and the output voltage will then decrease at the rate E/T volts per second. When the output voltage reaches zero, the potential across the capacitance will be 1 volt, the diode 40 will cease conducting, the output voltage will remain at zero volts, and the capacitance will continue to discharge to zero.

However, if the control voltage at 27 is changed to zero, the output at 31 will not follow the input at 30 when the input steps in a negative direction to zero. The output is held at 5 volts until such time as the control voltage at 27 is changed to some negative value. This permits the circuit to be used as a peak detector upon command, positive or negative peaks may be detected, depending upon the potentials applied at 25 and 27.

Thus it is seen that the rate of change of the output voltage at 31 is proportional to the amplitude of the control voltage at 25 for a positive going input at 30, and that the rate of change of the output is proportional to the amplitude of the control voltage at 27 for a negative going input. This arrangement provides for limiting the response of the circuit to higher frequency components without adversely affecting lower frequency components and also provides for controlling the limiting operation both as to polarity and time.

Referring again to the ramp generator of FIG. 1, the positive control voltage 24 has a positive value during the sweep portion of a cycle and drops to zero during the return or retrace portion. The positive value is selected to be equal to or slightly greater than the per step increase in the ramp voltage 15, thereby blocking positive going spikes. The zero value during retrace blocks all positive going signals during the retrace period. The negative control voltage 26 is maintained at zero during the sweep portion of the cycle, blocking all negative going signals. The negative control voltage is switched to a negative value greater than the peak value of the ramp, during the retrace portion so that the rapid retrace is not affected. Of course, the rate capability of the circuit must be equal to or slightly greater than the rate being developed by the digital counting circuitry so as not to affect the ramp itself. The spikes due to noncoincidence are of much higher rates and will be eliminated.

Figures 4, 5, 6:
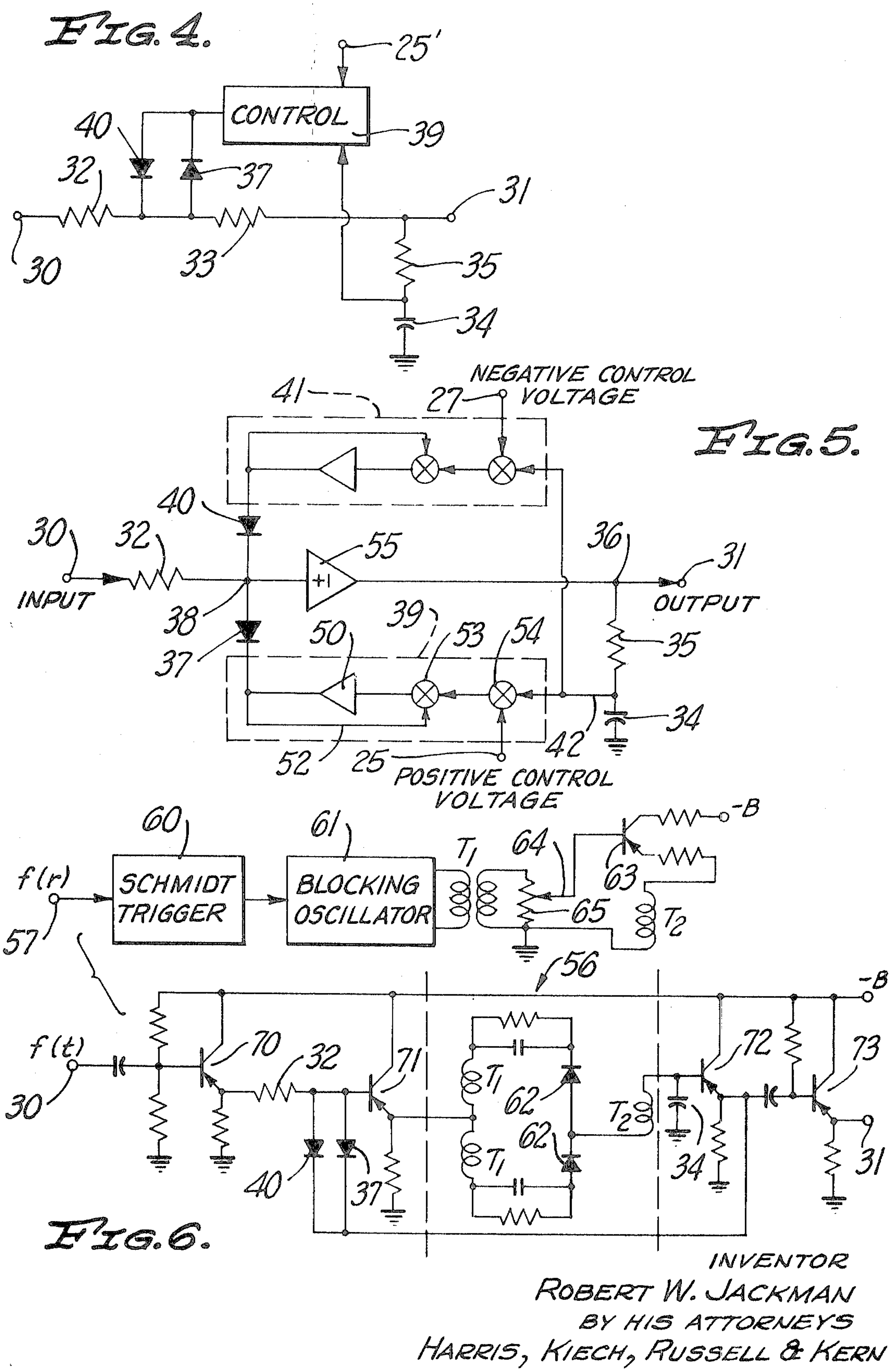
FIG. 5 is a detailed schematic illustrating a preferred form of the system of FIG. 2.
FIG. 6 is a detailed schematic illustrating a preferred form of the system of FIG. 3.

A preferred circuit for the control units 39, 41 of FIG. 2 is illustrated in FIG. 5, wherein elements corresponding to those of FIG. 2 are identified by the same reference numeral. The control unit 39 may include a noninverting amplifier 50 of relatively high gain (e.g., a gain of 100 or greater) with a negative voltage feedback connection 52 to a summing point 53. The positive voltage control on line 25 and the voltage from the capacitance 34 are combined at another summing point 54. The control circuit 41 may be similarly constructed. An amplifier 55, typically an emitter follower or a cathode follower, may be inserted between the junction points 38 and 36 to supply energy to the output 31 and avoid loading of the circuit by the following device, which is the display in the system of FIG. 1.

A number of variations may be made in the arrangement and operation of the rate limiter illustrated in FIGS. 1, 2 and 5. One diode can be used alone for controlling noise of one polarity only if desired. Both diodes may be supplied from a single control unit with a response increment being determined by the breakdown characteristics of the diode. The system may be operated without the external control voltages utilizing the diode characteristics and the voltage from the storage capacitance only.

Figure 3:
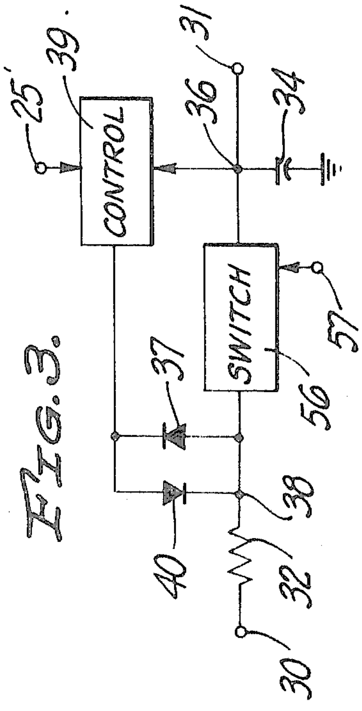
FIGS. 3 and 4 are block diagrams illustrating alternative embodiments of the invention of FIG. 2.

One alternative embodiment is illustrated in FIG. 3, wherein elements corresponding to those of FIG. 2 are identified by the same reference numerals A switch 56 provides for opening and closing the circuit between junction points 38 and 36, with the switch being controlled by a signal on line 57. The switch 56 provides for periodic sampling of the voltage at the input 30, with the capacitance 34 providing a memory for the output voltage at 31 during the intervals the switch is open. The diodes 37, 40 limit the maximum change which can occur, as described above. An external control voltage may be applied at 25′ if desired. In an alternative arrangement, a direct connection may be provided from the storage capacitance 34 to the diodes 37, 40, omitting the external control. A typical circuit with this arrangement is illustrated in FIG. 6 and provides for discriminating frequency components exhibiting low rates of change from frequency components exhibiting high rates of change. The circuit provides for sampling the unknown complex function $f(t)$ at a rate determined by a rate frequency $f(Tr)$. The rate frequency may be sinusoidal and is connected at the line 57 to a Schmidt trigger circuit 60 to generate trigger pulses for operating a blocking oscillator 61. The switch 56 may be a diode switch utilizing normally nonconducting diodes 62 which are enabled by the pulse from the blocking oscillator 61 coupled through the windings of the transformer T1. The outputs of the two windings in the diode switch circuit do not affect the output at terminal 31, since these windings are balanced within the switch diode loop. Any unbalance which occurs may be compensated for by the transformer T2 driven by the transistor 63, with the arm 64 of the voltage dividing potentiometer 65 being adjusted to provide balance in the quiescent state.

The circuit includes a high input impedance stage with the transistor 70, an impedance matching stage with the transistor 71 ahead of the switch 56, another impedance matching stage with the transistor 72 following the switch, and an output stage with the transistor 73.

Typically the pulse width of the output of the blocking oscillator will be less than one-tenth the period of the frequency $f(r)$. The increment of voltage change permitted is controlled by the forward and reverse conduction characteristics of the diodes 37, 40, since no external control voltages are utilized. For present day semiconductor diodes, the increment is about 0.6 volts. The value of the storage capacitance 34 is selected so that the discharge from the capacitance to the output through the impedance matching stage with transistor 72, during the period when the switch 56 is open, will be small, typically less than 10 percent of the incremental response permitted by the diodes.

The alternative form of FIG. 4 is similar to that of FIG. 3, with the series switch 56 omitted. An external control voltage on the line 25′ can be utilized to provide the equivalent of the switch open and switch closed conditions, if desired.

In the operation of the circuit of the invention, the storage capacitance 34 functions as a memory capacitance holding a voltage charge as a reference voltage for the control units. The load on the storage capacitance 34 is of very high impedance so that there is substantially no leakage or discharge current from the capacitance. This is in contrast to a capacitance shunted by a resistance so that the capacitance is discharged into the resistance, with the combination of capacitance and resistance functioning as an integrator.

The voltage on the capacitance 34 continuously varies as a function of the output voltage at 31, i.e., the voltage on the capacitance changes when the output voltage changes, independent of the magnitude of the output voltage. The charge on the storage capacitance and hence the reference voltage changes as a function of the output voltage, independent of the magnitude of the input voltage. In the embodiment of FIG. 2, the voltage on the capacitance continuously tracks the changes in the output voltage with a time delay due to the series resistance 35. In the embodiment of FIG. 3, the switch 56 produces a sample and hold type of operation with the output voltage remaining constant during the hold time and with the voltage on the capacitance 34 being changed during the sample time and remaining at or remembering the output voltage during the hold time.

In the embodiments of FIGS. 2 and 4, the signal path from the input 30 to the output 31 is through the resistors 32 and 33; in the embodiment of FIG. 3, the signal path is through the resistor 32 and the switch 56; and in the embodiment of FIG. 6, the signal path is through the transistor 70, resistor 32, transistor 71, switch 56 and transistors 72 and 73. Each of the diodes 37 and 40 is connected to the signal path, but neither is in the signal path. Each of the diodes acquires forward or reverse bias depending upon the present input signal and the output of the control unit. Each diode functions as an incremental limiting device to limit the magnitude of change of signal rather than limiting the magnitude of the signal.

Stated in another manner, the system of the invention looks at the signal at a time $t_1$ and looks at the signal at a time $t_2$ and limits the magnitude of change of signal which can occur in the time interval $t_2-_{t1}$, e.g., the system evaluates the incremental change in signal and applies a limit thereto which limit may be positive or negative or both and which may be constant or varied. The time interval is determined by the switch action in the embodiment of FIG. 3 and by the time constant of the resistor 35 and capacitance 34 in the embodiment of FIG. 2. The reference voltage at time $t_2$ is determined by the signal at time $t_1$. The reference voltage, the external control voltage if used, and the potential drop of the diode are combined to determine the maximum change permitted.

Although exemplary embodiments of the invention have been disclosed and discussed, it will be understood that other applications of the invention are possible and that the embodiments disclosed may be subjected to various changes, modifications and substitutions without necessarily departing from the spirit of the invention.

The embodiment of FIG. 1 illustrates the operation of the invention in voltage rate limiting, i.e., an operation in which the instantaneous amplitude or voltage of the input signal is restrained or limited to an allowable incremental change relative to a previous output voltage level. Thus the circuitry functions to limit the incremental voltage agility of the input signal. The same noise reduction circuitry of the invention may also function to limit the rate of change of frequency, or first derivative of frequency with respect to time, of the input signal.

I claim as my invention:

1. In a noise control system having an input and an output, the combination of:
- means for connecting a stepped wave signal to the input;
- circuit means defining a signal path for connecting the input to the output for signal transmission along said signal path from said input to said output;
- a storage capacitance;
- means connecting said storage capacitance between circuit ground and said circuit means at a first junction for charging to a voltage level continuously varying as an integral function of the voltage at said output, with said storage capacitance serving as a memory device to provide a reference voltage;
- a first diode having one terminal connected to said circuit means between said input and said first junction; and
- a first control circuit connected to the other terminal of said first diode so that said diode is out of said signal path, said control circuit providing a bias voltage to said diode for limiting the magnitude of voltage change at said output as the voltage changes at said input, and including means connecting the reference voltage of said storage capacitance as an input to said first control circuit.

2. A system as defined in claim 1 in which the reference voltage of said storage capacitance provides the only input to said first control circuit.

3. A system as defined in claim 1 including:
- a second diode having one terminal connected to said circuit means adjacent to and of opposite polarity to said first diode; and
- a second control circuit connected to the other terminal of said second diode so that said diode is out of said signal path, said control circuit providing a bias voltage to said diode for limiting the magnitude of voltage change at said output as the voltage changes at said input, and including means connecting the reference voltage of said storage capacitance as an input to said second control circuit.

4. A system as defined in claim 3 in which the reference voltage of said storage capacitance provides the only input to each of said first and second control circuits.

5. A system as defined in claim 1 including means for connecting an external voltage as a second input to said first control circuit, with the control circuit output to the diode varying as a function of the combined inputs of the control circuit.

6. A system as defined in claim 3 including:
- first means for connecting an external voltage as a second input to said first control circuit, with the control circuit output to the diode varying as a function of the combined inputs of said first control circuit; and
- second means for connecting an external voltage as a second input to said second control circuit, with the control circuit output to the diode varying as a function of the combined inputs of said second control circuit.

7. In a noise control system having an input and an output, the combination of:
- means for connecting a stepped wave signal to the input;
- circuit means defining a signal path for connecting the input to the output for signal transmission along said signal path from said input to said output;
- a storage capacitance;
- means connecting said storage capacitance between circuit ground and said circuit means at a first junction for charging to a voltage level continuously varying as an integral function of the voltage at said output, with said storage capacitance serving as a memory device to provide a reference voltage;
- a first diode having one terminal connected to said circuit means between said input and said first junction;
- a second diode having one terminal connected to said circuit means adjacent to and of opposite polarity to said first diode;
- a control circuit connected to the other terminal of each of said diodes so that each of said diodes is out of said signal path, said control circuit providing a bias voltage to the diodes for limiting the magnitude of voltage change at said output as the voltage changes at said input, and including means connecting the reference voltage of said storage capacitance as one input to said control circuit; and
- means for connecting an external voltage as a second input to said control circuit, with the control circuit output to the diodes varying as a function of the combined inputs of the control circuit.

8. A system as defined in claim 7 including switch means connected in said signal path at a location between said diodes and said first junction for opening and closing the connection of said circuit means between said system input and output.

9. In a noise control system having an input and an output, the combination of:
- circuit means defining a signal path for connecting the input to the output for signal transmission along said signal path from said input to aid output;
- a storage capacitance;
- means connecting said storage capacitance to said circuit means at a first junction for charging to a voltage level continuously varying as a function of the voltage of said output, with said storage capacitance serving as a memory device to provide a reference voltage; the voltage of said output, with said storage capacitance serving as a memory device to provide a reference voltage;
- a first diode having one terminal connected to said circuit means between said input and said first junction;
- a first noninverting negative voltage feedback amplifier;
- means for combining an external control voltage and the reference voltage of said storage capacitance at a mixing point as an input to said first amplifier; and
- means connecting the output of said first amplifier to the other terminal of said first diode so that said first diode is out of said signal path.

10. A system as defined in claim 9 including:
- a second diode having one terminal connected to said circuit means adjacent to and of opposite polarity to said first diode;
- a second noninverting negative voltage feedback amplifier;
- means for combining an external control voltage and the reference voltage of said storage capacitance at a mixing point as an input to said second amplifier; and
- means connecting the output of said second amplifier to the other terminal of said second diode, so that said second diode is out of said signal path.

11. In a noise control system having an input and an output, the combination of:
- means for connecting a stepped wave signal to the input;
- circuit means defining a signal path for connecting the input to the output for signal transmission along said signal path from said input to said output;
- a storage capacitance;
- means connecting said storage capacitance between circuit ground and said circuit means at a first junction for charging to a voltage level continuously varying as an integral function of the voltage of said output, with said storage capacitance serving as a memory device to provide a reference voltage;

a first diode having one terminal connected to said circuit means between said input and said first junction;

a second diode having one terminal connected to said circuit means adjacent to and of opposite polarity to said first diode;

switch means connected in said signal path at a location between said diodes and said first junction for opening and closing the circuit therebetween;

means for actuating said switch means in response to an externally applied signal; and means for connecting said storage capacitance to the other terminal of each of said diodes so that each of said diodes is out of said signal path.

12. In a ramp voltage generator for a cathode ray tube display or the like including a counter and a digital-to-analog converter producing a stairsteplike ramp voltage, with a ramp cycle comprising a sweep portion and a return portion, the improvement comprising a noise control system including:

a storage capacitance;

means connecting said storage capacitance between circuit ground and the converter output at a first junction for charging to a voltage level varying as an integral function of the voltage at said first junction, with said storage capacitance serving as a memory device to provide a reference voltage;

a first diode having one terminal connected to said converter output ahead of said first junction;

a second diode having one terminal connected to the converter output adjacent to and of opposite polarity to said first diode;

a first control circuit connected to the other terminal of said first diode with said diode out of the signal path between said converter and first junction, said control circuit providing a bias voltage to said diode for limiting the magnitude of voltage change at said first junction as the voltage output of the converter changes;

a second control circuit connected to the other terminal of said second diode with said diode out of the signal path between said converter and first junction, said control circuit providing a bias voltage to said diode for limiting the magnitude of voltage change at said first junction as the voltage of said converter output changes;

means connecting the reference voltage of said storage capacitance as an input to each of said control circuits;

means for generating a first control voltage coupled as another input to said first control circuit, said first control voltage having a first value during said sweep portion of a ramp cycle and changing to a second value during said return portion; and means for generating a second control voltage coupled as another input to said second control circuit, said second control voltage having a first value during said sweep portion of a ramp cycle and changing to a second value during said return portion.

13. In a ramp voltage generator for a cathode ray tube display or the like including a counter and an integral digital-to-analog converter producing a stairsteplike ramp voltage, with a ramp cycle comprising a sweep portion changing generally in one polarity and a return portion changing in the opposite polarity, the improvement comprising a noise control system including:

a storage capacitance;

means connecting said storage capacitance to the converter output at a first junction for charging to a voltage level varying as a function of the voltage at said first junction, with said storage capacitance serving as a memory device to provide a reference voltage;

a first diode having one terminal connected to said converter output ahead of said first junction;

a second diode having one terminal connected to the converter output adjacent to and of opposite polarity to said first diode;

a first control circuit connected to the other terminal of said first diode with said diode out of the signal path between said converter and first junction, said control circuit providing a bias voltage to said diode for limiting the magnitude of voltage change in said one polarity at said first junction as the voltage output of the converter changes;

a second control circuit connected to the other terminal of said second diode with said diode out of the signal path between said converter and first junction, said control circuit providing a bias voltage to said diode for limiting the magnitude of voltage change in said opposite polarity at said first junction as the voltage of said converter output changes;

means connecting the reference voltage of said storage capacitance as an input to each of said control circuits;

means for generating a first control voltage coupled as another input to said first control circuit, said first control voltage having a first value during said sweep portion of a ramp cycle to permit incremental changes in said one polarity of at least a single step, and changing to a second value during said return portion to limit change in said one polarity to substantially zero; and means for generating a second control voltage coupled as another input to said second control circuit, said second control voltage having a first value during said sweep portion of a ramp cycle to limit change in said opposite polarity of at least said return portion.

14. A process of controlling noise in an electrical signal handling system, including the steps of: generating a stepped wave signal generating a reference voltage as an integral function of the magnitude of the stepped wave signal at a first time; and at a second later time, limiting the magnitude of the signal as a function of the reference voltage combined with a predetermined value whereby changes in signal in the interval between the first and second times of magnitudes greater than the predetermined value are eliminated.

15. A process as defined in claim 14 in which the predetermined value includes a fixed value and a variable value.

16. A process as defined in claim 15 in which the fixed value is determined by the potential drop of a diode.

17. A process as defined in claim 14 including a first predetermined value for change in one direction of polarity and second predetermined value for change in the opposite direction of polarity.

* * * * *

UNITED STATES PATENT OFFICE
CERTIFICATE OF CORRECTION

Patent No. 3,628,061 Dated December 14, 1971

Inventor(s) Robert W. Jackman

It is certified that error appears in the above-identified patent and that said Letters Patent are hereby corrected as shown below:

Col. 2: Line 54, "THe" should read --The--.

Col. 5: Line 53, after "numerals", insert a period;
Line 69, "f(Tr)" should read --f(r)--.

Col. 8: Line 38, "aid" should read --said--;
Lines 44, 45, 46, after "voltage;" delete --the voltage of said output, with said storage capacitance serving as a memory device to provide a reference voltage;--.

Col. 9: Line 60, after "and" delete --an integral-- and insert --a--.

Col. 10: Line 42, after "polarity" insert --to substantially zero, and changing to a second value during said return portion to permit change in said opposite polarity--;
Line 45, after "signal", insert --;--.

Signed and sealed this 5th day of September 1972.

(SEAL)
Attest:

EDWARD M.FLETCHER,JR.
Attesting Officer

ROBERT GOTTSCHALK
Commissioner of Patents

USCOMM-DC 60376-P69
★ U.S. GOVERNMENT PRINTING OFFICE : 1969 O—366-334